US008177205B2

(12) United States Patent
Troller et al.

(10) Patent No.: US 8,177,205 B2
(45) Date of Patent: May 15, 2012

(54) DEVICE FOR DISPLACING JAWS OF A CLAMP

(75) Inventors: Andrew T Troller, Huntsville, AL (US); William S. Hutchins, Huntsville, AL (US); Paul C. Landreth, Scottsboro, AL (US)

(73) Assignee: PPG Industries Ohio, Inc, Cleveland, OH (US)

( * ) Notice: Subject to any disclaimer, the term of this patent is extended or adjusted under 35 U.S.C. 154(b) by 1016 days.

(21) Appl. No.: 12/132,258

(22) Filed: Jun. 3, 2008

(65) Prior Publication Data

US 2009/0295052 A1 Dec. 3, 2009

(51) Int. Cl.
*B23Q 3/08* (2006.01)

(52) U.S. Cl. ............................................ 269/25; 269/3

(58) Field of Classification Search .................... 269/31, 269/2, 6, 30, 27, 25
See application file for complete search history.

(56) References Cited

U.S. PATENT DOCUMENTS

| | | | | |
|---|---|---|---|---|
| 1,430,226 | A * | 9/1922 | Goodreau | 269/27 |
| 6,386,532 | B1 * | 5/2002 | Donovan et al. | 269/25 |

* cited by examiner

*Primary Examiner* — Lee D Wilson
*Assistant Examiner* — Jamal Daniel
(74) *Attorney, Agent, or Firm* — Andrew C. Siminerio

(57) ABSTRACT

A mechanical device for displacing jaws of a spring biased clamp includes a housing for receiving handles of the spring biased clamp. The housing has a platform moveable toward and away from a wall to move the handles of the clamp toward and away from one another, to move the jaws of the clamp away from and toward one another, respectively. A control member activates and deactivates a force applying member operationally connected to the platform, wherein activating the force applying member moves the platform toward the wall and deactivating the force applying member moves the platform away from the wall of the housing. The device is used to apply clamps to marginal edge portions of a stack of two one or more sheets to provide a clamped subassembly. The clamped subassembly in one embodiment is laminated to provide an aircraft transparency.

9 Claims, 6 Drawing Sheets

DEVICE FOR DISPLACING JAWS OF A CLAMP

1. Field of the Invention

This invention relates to a device for displacing jaws of a clamp, and more particularly, to a fluid, e.g. air operated device to apply pressure to the handles of a spring clamp to open and/or close the jaws of the spring clamp.

2. Discussion of the Present Technology

In the fabrication of laminated transparencies, e.g. laminated aircraft transparencies, glass and plastic sheets are selectively stacked one on top of the other to form a laminated subassembly. The sheets of the laminated subassembly are held together by a plurality of clamps, commonly referred to as "Pony spring clamps", mounted on marginal edge portions of the laminated subassembly to at least bias the marginal edges of the sheets together to seal the edges of the laminated subassembly and/or to secure the sheets of the laminated subassembly together. The laminated subassembly having the Pony spring clamps is further processed, e.g. the plastic sheets of the laminate subassembly are cured, and/or the plastic and glass sheets of the laminated subassembly are bent, to provide a laminated aircraft transparency.

In general, and not limiting to the discussion, the jaws of each one of the spring clamps is designed to apply an average of 24.6 foot-pound-force (33.33 joules) to the marginal edges of the laminate subassembly, and therefore require an average of at least 24.6 foot-pound-force (33.33 joules) to separate the jaws of the spring clamp to mount the spring clamp on, and to remove the spring clamps from, the marginal edges of the laminated subassembly. The spacing between the open jaws of spring clamps is preferably 50% greater than the thickness of the laminated subassembly to prevent the jaws of the clamp from accidentally contacting and marring the surface, and/or chipping the edge of the outer sheets of the laminated subassembly. Further, when mounting the spring clamp on the subassembly, the pressure on the spring clamp is preferably released slowly so that the jaws of the clamp engage the marginal edges of the outer sheets without the impact of the 24 foot-pound-force (33.33 joules) of the spring. The Pony spring clamps are usually mounted on the marginal edges of the laminate subassembly on a center-to-center spacing of about 3 inches (7.62 centimeters ("cm")). It is expected that an operator in an 8 hour period will repeat the cycle of opening and closing the Pony spring clamp several hundred times.

As can be appreciated by those skilled in the art of Ergonomics, it would be advantageous to reduce the amount of manual foot-pound-force required to open and/or close the jaws of the clamp without reducing the foot-pound-force applied by the biasing force, e.g. the spring, on the jaws of the clamp.

SUMMARY OF THE INVENTION

The invention relates to a device for displacing jaws of a spring biased clamp, e.g. of the type used to bias marginal edge portions of the sheets of a laminate subassembly toward one another. In one non-limiting embodiment of the invention, the device includes, among other things, a housing for receiving handles of the spring biased clamp, the housing having a first wall, a second wall, a third wall and a fourth wall and a platform positioned in the housing, wherein the first wall is opposite to and in facing relationship to the second wall. A force applying member acts on the platform to move the platform toward the first wall and away from the second wall to move the handles of the clamp toward one another against biasing action of the spring of the clamp and the jaws of the clamp away from one another, or to move the platform away from the first wall and toward the second side to permit the handles of the clamp under the biasing action of the spring to move away from one another and the jaws of the clamp to move toward one another. A control member activates and deactivates the force applying member, wherein when the force applying member is activated the platform moves toward the first wall and when the force applying member is deactivated, the platform moves away from the first wall of the housing.

The invention further relates to a method of securing two or more sheets of a laminate subassembly together. In one non-limting embodiment of the invention, the method includes, among other things, positioning handles of a spring biased clamp between a platform and a wall of a housing, wherein one of the handles of the clamp is adjacent the platform and is spaced from the wall, and the other one of the handles is adjacent the wall and is spaced from the platform. A first moving operation moves the platform toward the wall of the housing to move the handles of the clamp toward one another and to move jaws of the clamp away from one another; a second moving operation moves the clamp and the subassembly relative to one another to position the open jaws of the clamp over the marginal edge portion of the subassembly, and a third moving operation moves the platform away from the wall of the housing to move the handles of the clamp away from one another and to move the jaws of the clamp into engagement with the marginal edge portion of the subassembly.

DETAILED DISCUSSION OF THE INVENTION

Figure 1:
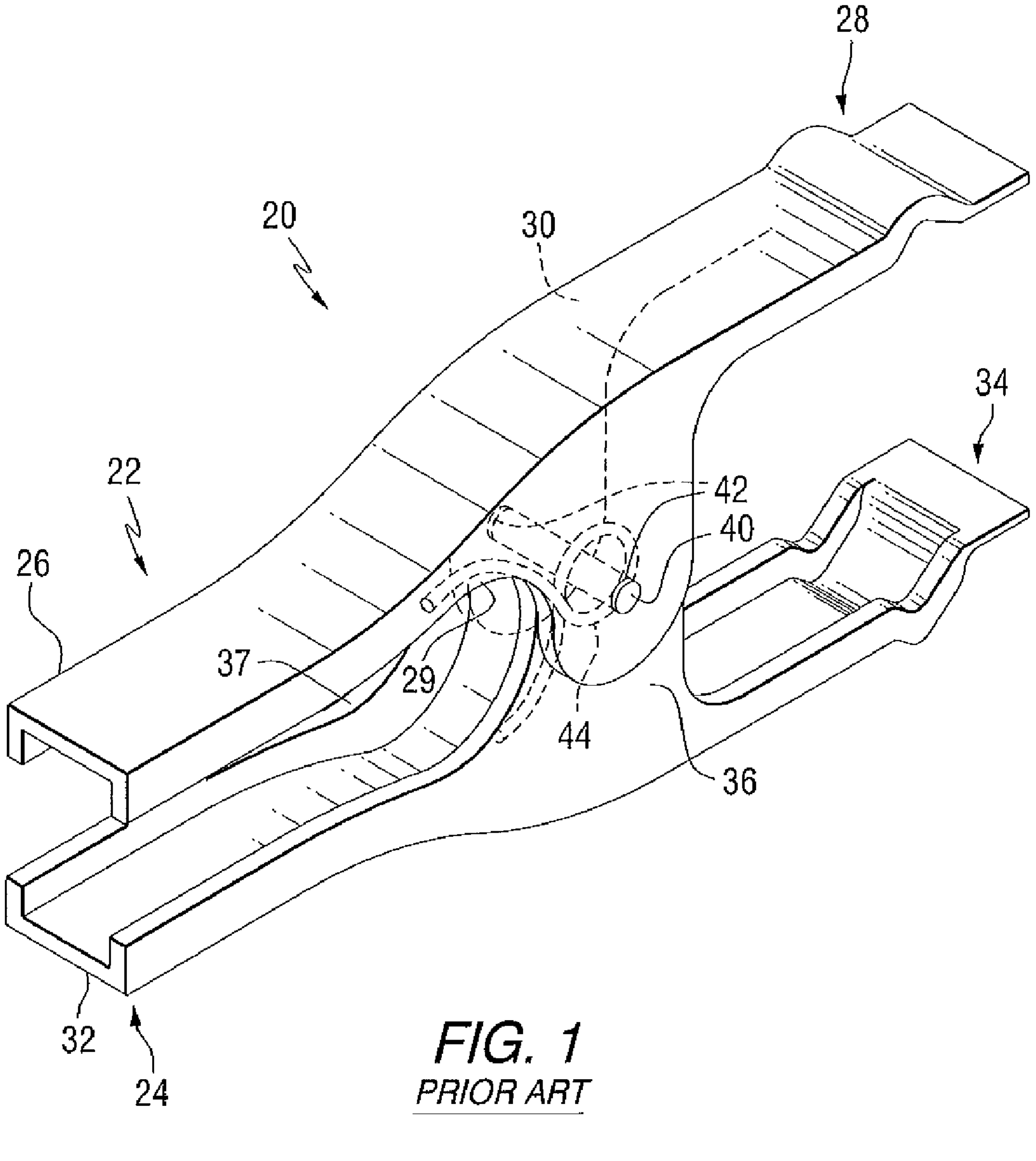
FIG. 1 PRIOR ART
FIG. 1 is an isometric back-side view of prior art clamp, e.g. a Pony spring clamp, which can be used in the practice of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired property sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the term "positioned over" means positioned on but not necessarily in surface contact with. For example, one article or component of an article "positioned over" another article or component of an article does not preclude the presence of materials between the articles, or between components of the article, respectively.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

In the following discussion, non-limiting embodiments of the invention are directed to applying Pony spring clamps to the marginal edge portions of a laminated subassembly made up of plastic and glass sheets that are selectively stacked one sheet on top of the other. The laminated subassembly is subsequently processed in any convenient or usual manner to secure surfaces of adjacent sheets together to fabricate a laminated assembly, e.g. an aircraft transparency or window. As is appreciated, the invention is not limited to the number of sheets in the laminated subassembly or the laminated assembly, and the invention can be practiced on a subassembly having 2 or more sheets, e.g. 2 to 5, 2 to 8, 2 to 10 sheets. Further, the invention is not limited to any particular type of laminated subassembly, and the invention contemplates the practice of the invention on a laminated subassembly subsequently made into, but not limited to, a commercial and residential windows; a transparency for any type of land vehicle; a canopy, cabin window and windshield for any type of air and space vehicle, transparency for any above or below water vessel, and any type of refrigerator or oven door. Still further, the invention is not limited to the material of the sheets, and the sheets can be made of, but not limited to, cured and uncured plastic sheets; annealed, heat strengthened, and heat and chemically tempered, clear, colored, coated and uncoated glass sheets; opaque sheets, e.g. but limited to wood and metal sheets, and glass sheets having an opaque coating, and combinations thereof.

Shown in FIG. 1 is a prior art pony spring clamp 20 having a first elongated lever member 22 and a second elongated lever member 24. The first lever member 22 includes a handle 26 at one end, and a jaw 28 at the opposite end, of the lever member 22, and opposite sides 29 and 30 between the handle 26 and the jaw 28. The second lever member 24 likewise includes a handle 32 at one end, and a jaw 34 at the opposite end, of the lever member 24, and opposite sides 36 and 37 between the handle 32 and the jaw 34. The sides of one of the members, e.g. but not limited to, the sides 36 and 37 of the lever member 24 are positioned between the sides of the other member, e.g. the sides 29 and 30 of the member 22, and the lever members 22 and 24 held in position by a shaft 40 passing through holes 42 in the sides 29, 30, and 36, 37 of the lever members 22 and 24, respectively. A biasing member, e.g. but not limited to a spring 44 is mounted on the shaft 40 and biases the jaws 28 and 34 of the lever members 22 and 24, respectively, toward one another. With the above arrangement, applying a force to the handles 26 and 32 urges the handles toward one against the biasing action of the spring 44 to move the jaws 28 and 34 away from one another, and reducing the force applied to the handles 26 and 32, allows the handles 26 and 32 to move away from one another, to move the jaws 28 and 34 toward one other, under the biasing action of the spring 44. Spring clamps of the above type are sold by Pony Clamp Company (Model 3202). The invention is not limited to the biasing force of the spring 44, and clamps 20 of the type shown in FIG. 1 having springs 44 that apply a biasing force of 24.6 foot pounds (33.33 joules) to the jaws 28 and 34 have been used in the practice of the intention. Further, as is appreciated, the invention is not limited to the design of the clamp 20, e.g. the design of the jaws 28 and 34, and any of the clamp designs used in the art can be used in the practice of the invention.

Figure 2:
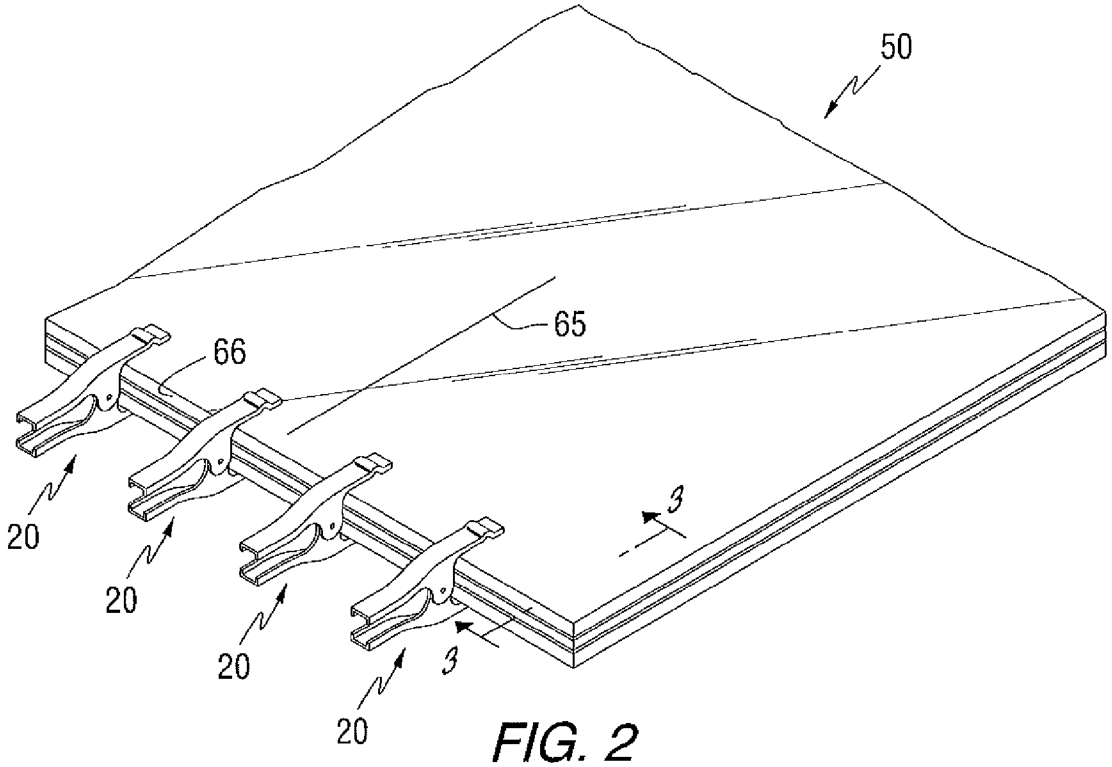
FIG. 2 PRIOR ART
FIG. 2 is a partial side-top isometric view of a prior art laminate subassembly having clamps; the clamps in the prior art version of the laminate subassembly are applied in accordance to the teachings of the invention.
Figure 3:
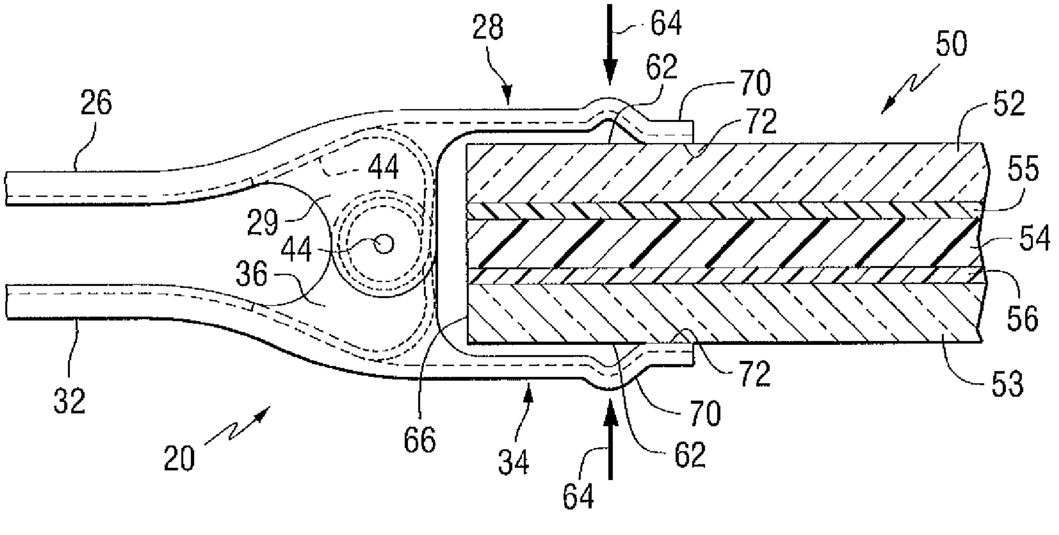
FIG. 3 PRIOR ART
FIG. 3 is a view taken along lines 3-3 of FIG. 2.

Shown in FIGS. 2 and 3 is a laminate subassembly 50 including a first outer chemically tempered glass sheet 52, an opposite second outer chemically tempered glass sheet 53, an inner polycarbonate sheet 54, a first plastic interlayer sheet 55 between the first outer glass sheet 52 and the polycarbonate sheet 54, and a second plastic interlayer sheet 56 between the second sheet 53 and the polycarbonate sheet 54 (clearly shown in FIG. 3). As is appreciated, the sheets of the subassembly 50 can be flat or contoured. A plurality of spaced spring clamps 20 have their jaws 28 and 34 engaging marginal edge portions 62 of the outer sheets 52 and 53 of the subassembly 50 to bias the marginal edge portions 62 of the sheets 52-56 of the laminate subassembly 50 toward one another in the direction of arrows 64 (shown only in FIG. 3). Although not limiting to the invention, end 70 of the jaws 28 and 34 of the clamp 20 has a flat sheet-engaging surface or area 72 to apply a force to a discrete area of the marginal edge portion 62 of the subassembly 50. As is appreciated, the invention is not limited to the shape or the dimensions of the area 72 of the jaws 28 and 34, and the area 72 can have any configuration and/or dimensions to engage the marginal edge portion 66 of the laminated subassembly 50.

As used herein the term "marginal edge portion" refers to the portion the laminated subassembly 50 that extends along a straight line 65 (shown only in FIG. 2) from peripheral edge 66 of the outer sheets or the subassembly inwardly toward the center of the outer sheets or subassembly, respectively (shown only in FIG. 2). As can be appreciated, the invention is not limited to the length of the marginal edge portion as measured along the straight line 65, however non-limiting embodiments of the invention, include the marginal edge portion having a length equal to 5, 10 and 25 percent of the length or width, as the case maybe, of the subassembly 50.

Figure 4:
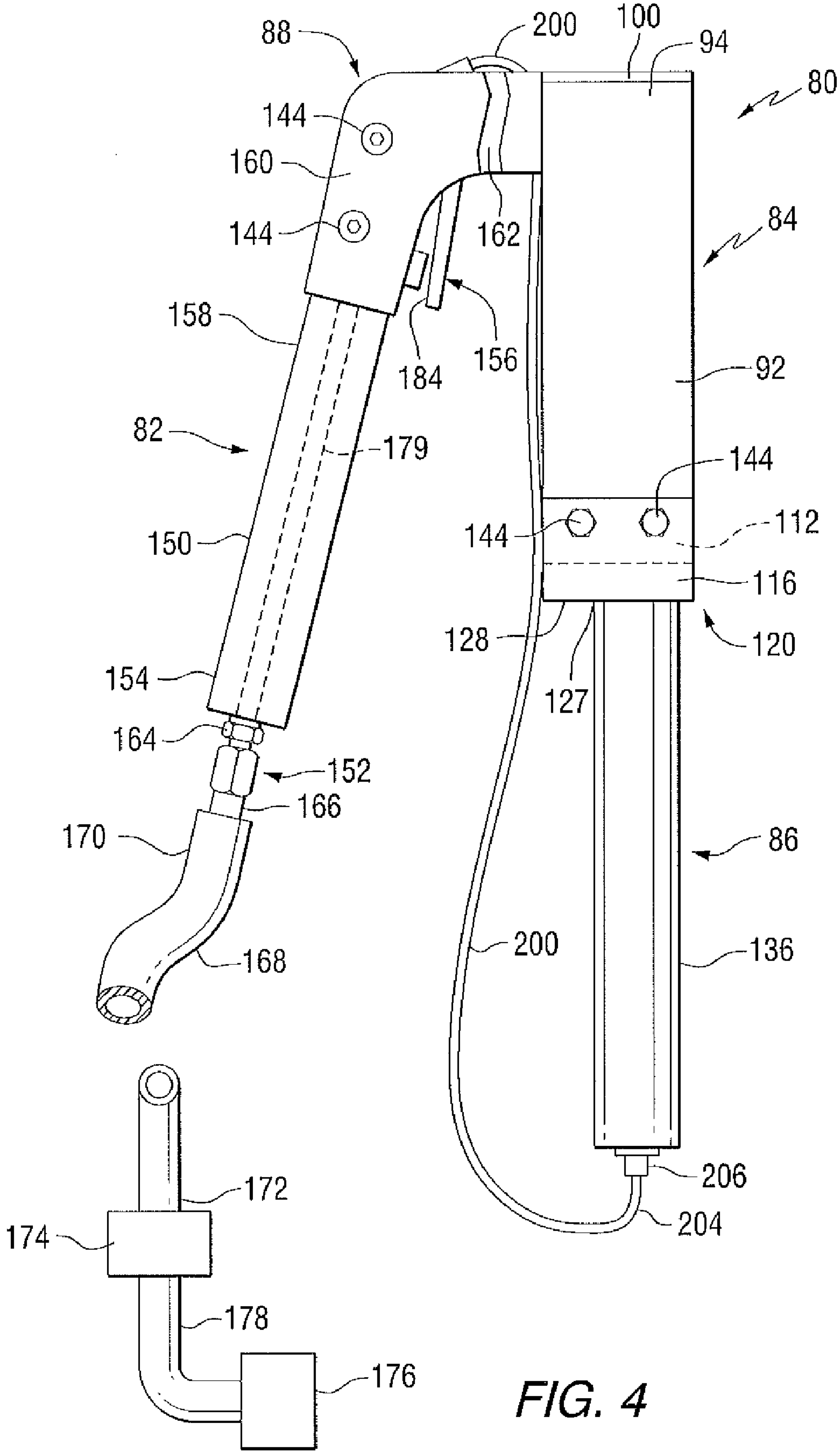
FIG. 4 is a side elevated view of a device of the invention for opening and closing the jaws of the clamp of FIG. 1 in accordance to the teachings of the invention, also shown in FIG. 4 is a fluid supply arrangement for the device.
Figure 5:
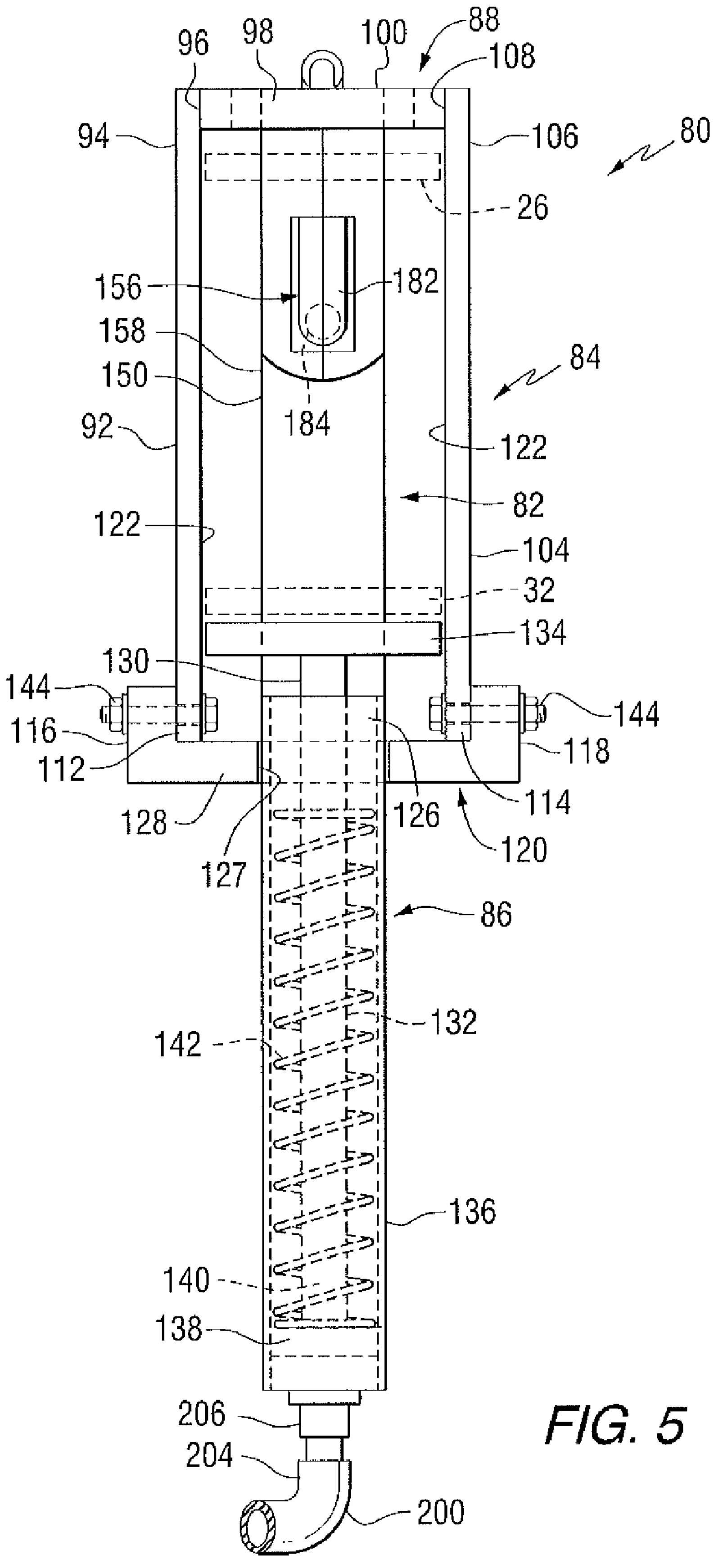
FIG. 5 is front elevated view of the device of the invention shown in FIG. 4.

The discussion is now directed to non-limiting embodiments of the device of invention to controllably increase, or decrease applied force to the handles 26 and 32 of the spring clamp 20 to open and close, respectively the jaws 28 and 34 of the clamp 20. With reference to FIGS. 4 and 5 as needed, there is shown a non-limiting embodiment of a device of the invention designated by the number 80. The device 80 includes a handle 82, a housing 84, a pressure applying member 86 connected to the housing 84 and a connecting member 88 connecting the handle 82 to the housing 84 (see FIG. 4). The housing 84 includes a first plate member 92 having an end 94 secured to one side 96 of an end portion 98 of base 100 of the connecting member 88, and a second plate member 104 having an end 106 secured to opposite side 108 of the end portion 98 of the base 100 of the connecting member 88 (clearly shown in FIG. 5}.

With continued reference to FIG. 5, opposite ends 112 and 114 of the plate members 92 and 104 are secured to legs 116 and 118, respectively of U-shaped member 120. The space between inner surfaces 122 of the plate members 92 and 104 is sized to receive the handles 26 and 32 (shown in phantom in FIG. 5) of the clamp 20. Although not limiting to the invention, to limit rotational and sliding motion of the handles 26 and 32 of the clamp 20 toward and away from the inner surfaces 122 of the plate members 92 and 104 when the handles 26 and 32 are positioned between the plate members 92 and 104, the distance between the inner surfaces 122 of the plate members 92 and 104 is about one half greater than the width of the handles 26 and 32 of the clamp 20.

With continued reference to FIG. 5, an end 126 of the pressure applying member 86, e.g. but not limiting to the invention, a single action piston air cylinder is mounted in hole 127 in base 128 of the U-shaped member 120 and secured in the hole 127 in any convenient manner, with external end 130 of piston 132 of the air cylinder 86 facing the base 100 of the connecting member 88. A platform 134 sized to support a handle 26 or 32 of the clamp 20 is mounted on the end 130 of the piston. With this arrangement, as air moves into body 136 of the air cylinder 86 in a manner discussed below, the piston 132 moves out of the body 136 of the air cylinder 86 to move the platform 134 toward the base 100 of the connecting member 88. As the piston 132 moves out of the body 136 of the cylinder 86, plate 138 mounted on internal end 140 of the piston 132 compresses spring 142 in the body 136 of the cylinder 86. When the air pressure acting on the piston 132 to move the piston 132 out of the body 136 of the cylinder 86 is less than the biasing pressure of the spring 142, the biasing pressure or force of the spring 142 acting on the plate 138 moves the piston 132 away from the base 100 of the connecting member 88 into the body 136 of the cylinder 86. An air cylinder of the type sold by Norgren Ltd Model RLD03A-SAN-AA00 was used in the practice of the invention.

The distance between the platform 134 on the external end 130 of the piston 132 and the base 100 of the connecting member 88 when the biasing pressure of the spring 132 of the cylinder 86 exceeds the air pressure acting on the piston 132, is greater than the distance between the handles 26 and 32 of the clamp 20 when the jaws 28 and 34 are in contact with one another. In this manner the handles of the clamp can easily be positioned between the platform 134 and the base 100 of the connecting member 88.

As is appreciated the invention is not limited to the manner in which (a) ends 94 and 106 of the plate members 92 and 104 are secured or connected to the sides 96 and 108 of the base 100; (b) the legs 116 and 118 of the U-shaped member 120 are secured or connected to the ends 112 and 114 of the plate members 92 and 104, respectively, and (c) the end 126 of the cylinder 84 is secured connected in the hole 127 of the base 100 of the U-shaped member. For example, and not limiting to the invention, the securing and connecting can be by welding, e.g. welding the ends 94 and 106 of the plate members 92 and 104 to the sides 96 and 108 of the base 100, or by fasteners, e.g. joining the legs 116 and 118 of the U-shaped member 120 to the ends 112 and 114 of the plate members 92 and 104 by one or more nut and bolt assemblies 144.

Figure 6:
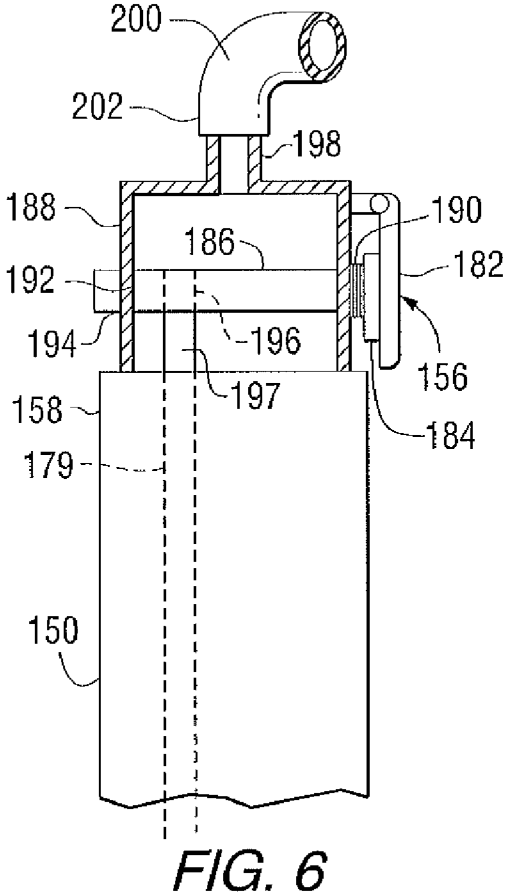
FIG. 6 is an elevated side view of a trigger having portions removed for purposes of clarity, the trigger set in a position to move a fluid from the fluid supply arrangement to a pressure-applying member of the device of the invention to open the jaws of the clamp in accordance to the teachings of the invention.
Figure 7:
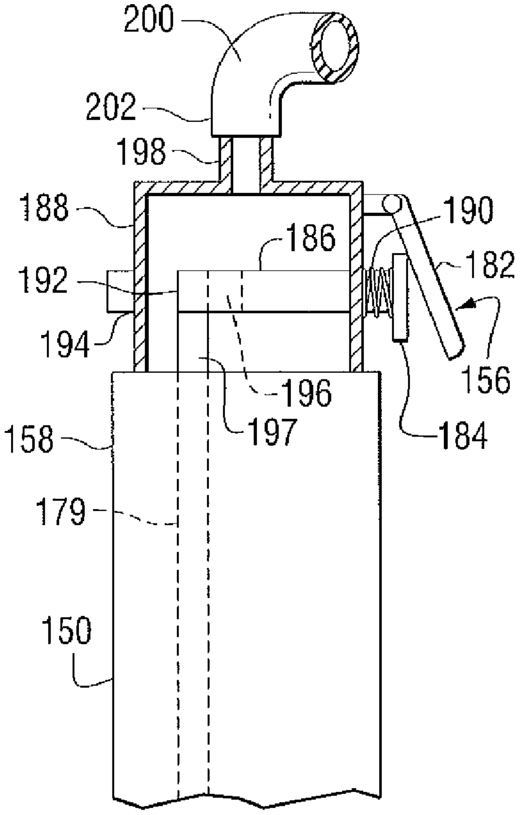
FIG. 7 is a view similar to the view of FIG. 6 with the trigger set in a position to move the fluid from the pressure-applying member of the device of the invention to the atmosphere to close the jaws of the clamp in accordance to the teachings of the invention.

With continued reference to FIGS. 4 and 5 as needed, the handle 82 includes a hollow rigid conduit 150 having connecting valve 152 securely connected at a first end 154 of the conduit 150, and a trigger 156 securely connected at opposite second end 158 of the conduit 150 (clearly shown in FIGS. 6 and 7). A portion of the conduit 150 at the second end 158 is secured in any convenient manner, e.g. by one or more nut and bolt assemblies 144 (shown only in FIG. 4), between a pair of spaced plates 160 and 162 of the connecting member 88. As can now be appreciated, the connecting member 88 includes, but is not limited to, the base 100 connected at one end portion to the plates 92 and 104 (see FIG. 5) as discussed above, and the base 100 at the opposite end portion having the plates 160 and 162 to receive the conduit 150 there-between (see FIG. 4) as discussed above.

The connecting valve 152, e.g. but not limited to one part 164 of a quick release valve 152 is connected to a second part 166 of the quick release valve 152. An air hose 168 has one end 170 connected to second part 166 of the quick release valve 152, and opposite second end 172 of the hose 168 connected to an air pressure regulator 174. The air pressure regulator 174 is connected to a pressurized air supply 176 by an air hose 178. A hose 179 is positioned within the conduit 150 and has one end connected to the part 164 of the quick release valve 152 (see FIG. 4), and the opposite end connected to the trigger 156 (see FIGS. 6 and 7. in a manner discussed below.

In one non-limiting embodiment of the invention, the trigger 156 is a two stage trigger to flow air to the pressure applying member or the air cylinder 86 in a manner discussed below during the first stage, e.g. a cylinder activating stage, and to flow air from the pressure applying member or air cylinder 86 to the atmosphere in a manner discussed below during the second stage, e.g. a cylinder deactivating stage. More particularly and with reference to FIGS. 6 and 7 as needed, during the first stage, plate 182 of the trigger 156 is moved against end 184 of plunger 186 of the trigger 156 to move the plunger 186 into barrel 188 of the trigger 156. The plunger 186 moves into the barrel 188 against the biasing action of spring 190 to move end 192 of the plunger 186 against port 194 seal or close the port 194. The port 194 is an opening that provides communication between the interior of the barrel 188 and the environment outside the barrel 188. With the end 192 of the plunger 186 closing or sealing the port 194, passageway 196 in the plunger 186 is aligned with the opening 197 of the trigger 156. As shown in FIGS. 6 and 7, the passageway 196 of the trigger 156 is connected to the hose 179 positioned in the conduit 150 of the handle 82 (see FIG. 4).

Pressurized air moves out of the barrel 188 of the trigger 156 through outlet 198 of the barrel 188 and through hose 200 having one end 202 connected to the outlet 198 (see FIGS. 6 and 7). Opposite end 204 of the hose 200 is connected to end 206 of the air cylinder 86 (see FIGS. 4 and 5) to pass the pressurized air from the hose 200 into the body 136 of the cylinder 86. The pressurized air moves the piston 132 out of the body 136 of the cylinder 86 against the biasing action of the spring 142 to engage and move the handles 26 and 32 (see FIGS. 1 and 3) toward one another as discussed above. As can be appreciated, the invention is not limited to the air pressure used to move the handles 26 and 32 of the clamp 20 toward one another against the biasing action of the spring 44 (see FIG. 3). In one non-limiting embodiment of the invention, 80 pounds pressure of air was used to bias the handles of spring clips of the type known in the art as Pony, model number 3202 and sold by Adjustable Clamp Company of Chicago, Ill.

The trigger 156 is moved to the second stage by reducing the force applied to the plate 182 of the trigger 156 to move the plunger 186 out of the barrel 188 by the biasing action of the spring 190 acting on the end 184 of the plunger 186. As the plunger 186 moves out of the barrel 188, the end 192 of the plunger 186 moves away from the port 194 and the passageway 196 in the plunger 186 moves over the opening 197 of the trigger 156. Continued movement of the plunger 186 out of the barrel 188 of the trigger 156 moves the end portion 192 of the plunger 186 over the opening 197 to stop the flow of air from the hose 179 into the barrel 188 of the trigger 156. The spring 142 of the air cylinder 86 (see FIG. 5) moves the piston 132 into the body 136 of the air cylinder 86 moving air out of the body 136 of the cylinder 86 through the hose 200 into the barrel 188 of the trigger 156 and out of the barrel 188 through the port 194 (see FIG. 7).

As can be appreciated the invention is not limited to any particular trigger arrangement to move air into the cylinder 86 and to allow air to move out of the cylinder. In one non-limiting embodiment of the invention a trigger of the type sold by Ingersoll-Rand Model 201-C-M was used.

As is appreciated, the invention is not limited to the manner by which the clamps 20 are applied to the marginal edge portions 62 of a laminate subassembly 50 (see FIG. 2). In one non-limiting embodiment of the invention, the trigger 156 is in the second stage, e.g. the cylinder deactivating stage and the piston 132 is in the body 136 of the cylinder 86 (see FIG. 5). The handles 26 and 32 of one of the clamps 20 are positioned between the inner surface 122 of the plate members 92 and 104 of the device 80 of the invention (see FIG. 5). The plate 182 of the trigger 156 is depressed to move the plunger 186 of the trigger 156 against the biasing action of the spring 184 into the barrel 188 to restrict the flow of air out of the port 194 and increase the flow of pressurized air from the hose 179 into the barrel 188 of the trigger 156.

The pressurized air moving into the barrel 188 of the trigger 156 moves through the hose 200 into the body 136 of the cylinder 86 to move the piston 132 against the biasing action of the spring 142 out of the body 136 of the cylinder 86 into engagement with one of the handles, e.g. the handle 32 of the clamp 20. Continued movement of the piston 132 out of the body 136 of the cylinder moves the other one of the handles, e.g. the handle 26 of the clamp 20 against the base 100 of the connecting member 88 (see FIG. 5) to move the handles 26 and 32 toward one another, and the jaws 28 and 34 of the clamp 20 away from one another. After the jaws 28 and 34 of the clamp 20 are fully open or spaced a predetermined distance apart, the jaws of the clamp are positioned over the marginal edge portions 62 of the laminate subassembly 50, and the pressure on the plate 182 of the trigger 156 is slowly released to slowly move the end 192 of the plunger 186 away from the port 194 and the passageway 196 in the plunger 186 slowly over the opening 197 of the conduit 150 to allow the piston 132 of the cylinder 86 to slowly move into the body 136 of the cylinder 86 to slowly move the jaws 28 and 34 of the clamp 20 into engagement with the marginal edge portions 62 of the laminate subassembly 50. After the jaws 28 and 34 of the clamp 20 fully engage the laminate subassembly 50, the plate 182 of the trigger 156 is released and the piston 132 moves at a faster speed into the body 136 of the air cylinder 86 under the biasing action of the spring 142. The device 80 of the invention is moved away from the clamp 20. The forgoing procedure is repeated to position a predetermined number of clamps 20 on the marginal edge portions 62 of the laminate subassembly 50.

After the laminate subassembly if shape, formed and/or pressed into a laminate in any convenient manner, the clamps are removed from the laminate, in any convenient manner. In one non-limiting embodiment of the invention, the clamps 20 are individually removed from the marginal edge portions 62 of the laminate by positioning the inner surfaces 122 of the plate members 92 and 104 over the handles 26 and 32 of one of the clamps 20. The trigger 156 is in the second stage, e.g. the cylinder deactivating stage and the piston 132 is in the body 136 of the cylinder 86 (see FIG. 5). A force is applied to the plate 182 of the trigger 156 to move the plunger 186 of the trigger 156 against the biasing action of the spring 184 into the barrel 188 to restrict the flow of air out of the port 194 and increase the flow of air through the hose 179 into the barrel 188 of the trigger 156.

The pressurized air moving into the barrel 188 of the trigger 156 moves through the hose 200 into the body 136 of the cylinder 86 to move the piston 132 against the biasing action of the spring 142 out of the body 136 of the cylinder 86 into engagement with one of the handles, e.g. the handle 32 of the clamp 20. Continued movement of the piston 132 out of the body 136 of the cylinder moves the other one of the handles, e.g. the handle 26 of the clamp 20 against the base 100 of the connecting member 88 (see FIG. 5) to move the handles 26 and 32 toward one another, and the jaws 28 and 34 of the clamp 20 away from one another. After the jaws 28 and 34 of the clamp 20 are spaced from the outer sheets 52 and 53 (see FIG. 3) of the laminate, the device 80 of the invention having the clamp is moved away from the peripheral edge 66 of the laminate to move the jaws 28 and 34 over and away from the outer sheets 52 and 53, respectively. After the clamp 20 is clear of the laminate, the pressure on the plate 182 of the trigger 156 is released to move the end 192 of the plunger 186 away from the port 194 and the passageway 196 in the plunger 186 over the opening 197 of the conduit 150 to allow the piston 132 of the cylinder 86 to move into the body 136 of the cylinder 86 to release the handles 28 and 34 of the clamp 20. The forgoing procedure is repeated to remove the clamps 20 from the marginal edge portions 62 of the laminate.

Figure 8:
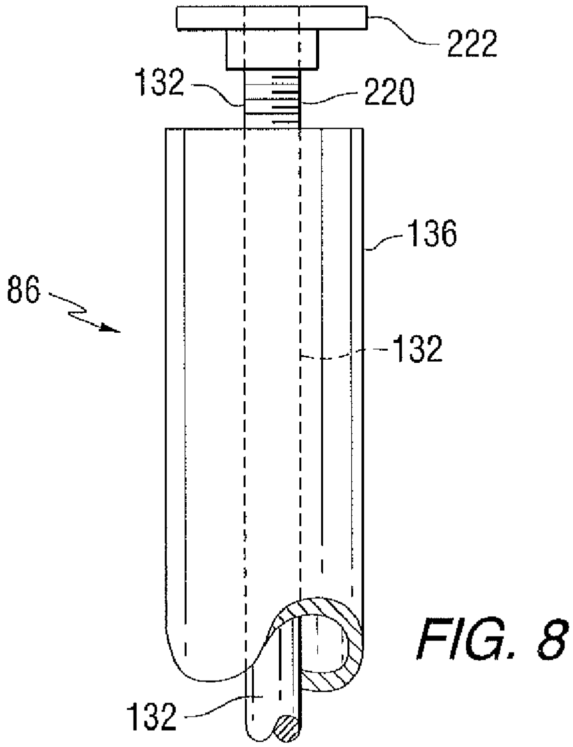
FIG. 8 is a fragmented front view of one non-limiting embodiment of a pressure-applying member of the invention.

With reference to FIG. 8, in another non-limiting embodiment of the invention, end 220 of the piston 132 that extends out of the body or housing 136 of the air cylinder 86 is threaded to receive a platform 222. The platform 222 is threaded onto the threaded end 220 of the piston 132 to provide for adjustments, e.g. to increase or decrease, the length of the stroke of the piston 132.

Figure 9:
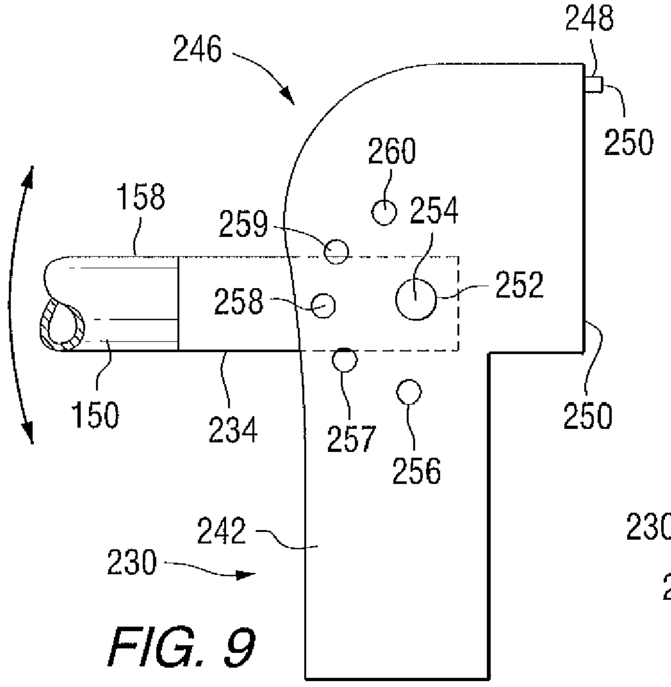
FIG. 9 is a side elevated view of an upper portion of a non-limiting embodiment of a moveable handle of the invention.
Figure 10:
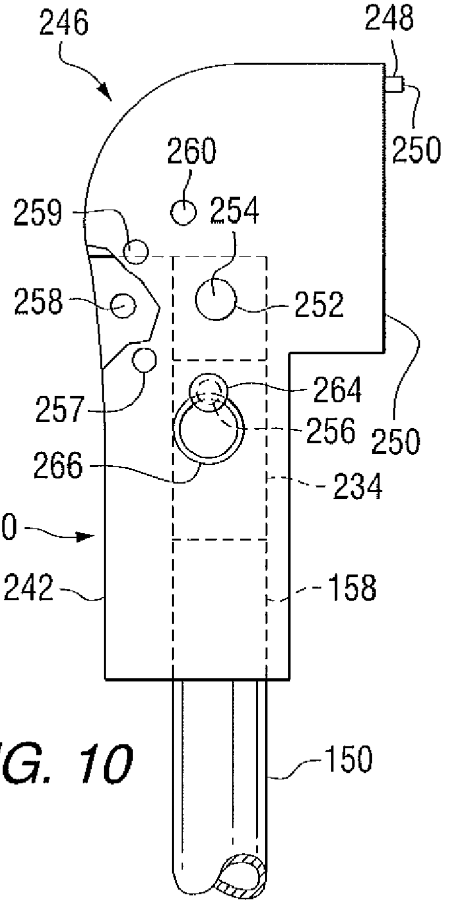
FIG. 10 is a view similar to the view of FIG. 9 showing the handle mounted in one of a plurality of positions.
Figure 11:
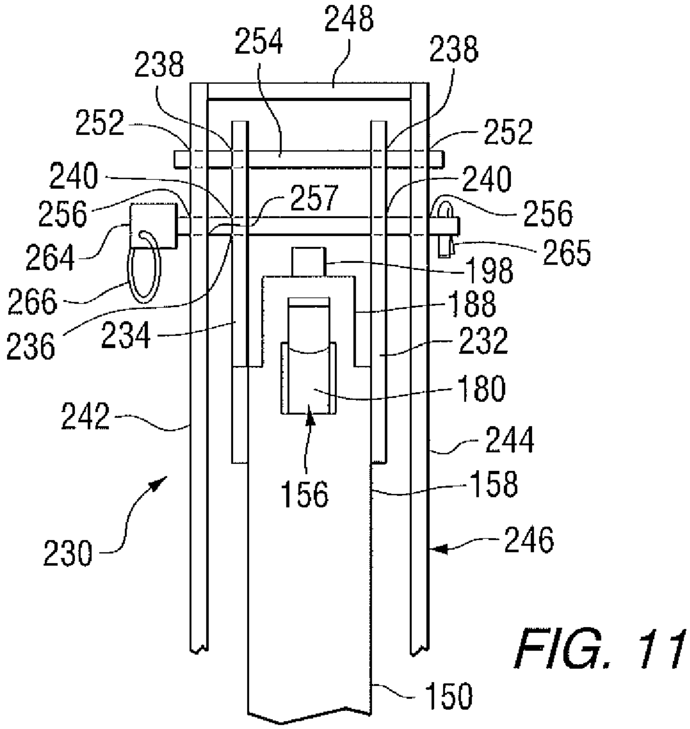
FIG. 11 is a front view of the moveable handle shown in FIG. 10.

With reference to FIGS. 9-11 as needed, in another non-limiting embodiment of the invention, handle 230 is moveable for adjustments based on the relationship between the position of the laminated subassembly 50 and the device 80 of the invention. The handle 230 includes the second end 158 of the conduit 150 having the trigger 156 (see FIG. 11) secured to, and between a pair of plates 232 and 234. Each of the plates 232 and 234 has a pivot hole 238 and a retention hole 240 (see FIG. 11). The plates 232 and 234 are mounted between legs 242 and 244 of a U-shaped connecting member 246, shown inverted in FIG. 11. The legs 242 and 244 have one side connected to base 248 of the U-shaped connecting member 246, and the U-shaped connecting member 248 has end 250 of the base 248 secured to the housing 84 (see FIG. 5) in a similar manner as the base 100 of the connecting member 88 is secured to the housing 84.

Each of the legs 242 and 244 of the U-shaped member 246 has a pivot hole 252 aligned with the pivot hole 238 of the plates 232 and 234. A shaft 254 (clearly shown in FIG. 11) passes through the pivot holes 238 and 252 of the plates 232 and 234, and of the legs 242 and 244, respectively, and is secured in position in the pivot holes 252 of the legs 242 and 244 such that the plates 232 and 234, and the conduit 150 are moveable in a clockwise and counterclockwise direction around the shaft 254 as shown in FIG. 9.

Each of the legs 242 and 244 further include a plurality of retention holes 256-260 (see FIGS. 10 and 11) along an actuate path (see FIGS. 9 and 10), with the retention hole 240 of the plates 232 and 234 (see FIG. 11) moving along the path past the openings of the retention holes 256-260 as the plates 232 and 234, and the conduit 150 pivots around the shaft 254. A headed locking pin 262 having spring biased end pins 265 (clearly shown in FIG. 11) passes through the retention hole 256 in the leg 242, the retention holes 240 in the plates 232 and 234 and through the retention hole 256 in the leg 244 to secure the conduit 150 of the handle 230 in a selected position. The locking pin 264 has a pull ring 266 for ease of pulling the pin out of the retention holes.

In still another embodiment of the invention, the spring 142 of the pressure applying member or cylinder 86 can be eliminated, and the biasing action of the spring 44 of the spring clamp 20 used to move the piston 132 of the force applying member 86 into the body 136 of the cylinder 86.

As can be appreciated, the invention is not limited to the embodiments of the invention discussed herein, and the scope of the invention is only limited by the scope of the following claims.

What is claimed is:

1. A device for displacing jaws of a spring biased clamp, the device comprising:

a housing for receiving handles of the spring biased clamp, the housing having a first wall, a second wall, a third wall and a fourth wall and a platform positioned in the housing, wherein the first wall is opposite to and in facing relationship to the second wall;

a force applying member acting on the platform to move the platform toward the first wall and away from the second wall to move the handles of the clamp toward one another against biasing action of a spring of the clamp and the jaws of the clamp away from one another, or to move the platform away from the first wall and toward the second wall to permit the handles of the clamp under the biasing action of the spring to move away from one another and the laws of the clamp to move toward one another;

a control member to activate and deactivate the force applying member, wherein when the force applying member is activated the platform moves toward the first wall and when the force applying member is deactivated, the platform moves away from the first wall of the housing;

a connecting member having a U-shaped first end portion, and the housing at a second opposite end portion of the connecting member, wherein the first wall of the housing is the second end portion of the connecting member, and wherein the force applying member is a piston moveable into and out of an end of a cylinder, wherein the end of the cylinder is mounted to a second wall of the housing; the end portion of the piston extends through the second wall of the housing, and the end of the piston is connected to the platform, and the control member is mounted on an end of a handle, wherein the end of the handle and the control member are mounted between legs of the U-shaped portion of the connecting member.

2. The device according to claim 1 wherein the piston moves out of the cylinder under fluid pressure and moves into the cylinder under biasing force of a spring.

3. The device according to claim 1 wherein the control member comprises a chamber having three ports, wherein the first port and the second port are opened and the third port is closed for the control member to move the piston out of the cylinder, and the second port and third port are fully opened or partially opened for the control member to cease movement of the piston out of the cylinder.

4. The device according to claim 3 further comprising a first conduit connecting the first port of the control member to a pressurized fluid supply, a second conduit connecting the second port of the control member to the cylinder, and the third port connecting interior of the chamber of the control member to the environment.

5. The device according to claim 4 wherein there is no movement of the piston out of the cylinder when pressure at the second port is greater than pressure in the chamber of the control member, and the piston moves out of the cylinder when pressure at the second port is less than the pressure in the chamber of the control member.

6. The device according to claim 5 wherein with the control member deactivated, pressurized fluid moves from the cylinder through the second conduit and through the second and third external ports of the control member, wherein the handles of the spring biased clamp move away from one another, and jaws of the clamp move toward one another.

7. The device according to claim 6 wherein the control member has a lever, and the lever in a first position activates the control member, and the lever in a second position deactivates the control member, wherein moving the lever from the second position to the first position moves the platform toward the first wall of the housing to open the jaws of the clamp, and moving the lever from the first position to the second position moves the platform away from the first wall of the housing to move the jaws of the clamp toward one another.

8. The device according to claim 7 wherein the piston moves into the cylinder under biasing force of a spring and as the piston moves into the cylinder, the fluid in the cylinder moves out of the cylinder, through the second conduit and through the second and third ports of the control member.

9. The device according to claim 1 wherein the end of the handle is pivotally mounted between the legs of the U-shaped portion of the connecting member and each of the legs has a plurality of holes along a circular path, wherein a locking pin passes through selected ones of the plurality of holes to secure the handle in one of a plurality of positions on the path.

* * * * *